B. W. Hood.
Thimble.

Nº 971.  
31975.
Patented Apr. 9, 1861.

Witnesses

Inventor

UNITED STATES PATENT OFFICE.

BENJAMIN W. HOOD, OF PAWTUCKET, MASSACHUSETTS.

THIMBLE.

Specification of Letters Patent No. 31,975, dated April 9, 1861.

*To all whom it may concern:*

Be it known that I, BENJAMIN W. HOOD, of Pawtucket, in the county of Bristol and State of Massachusetts, have invented a new and Improved Thimble; and I do hereby declare that the following is a full, clear, and exact description of the same, reference being had to the accompanying drawings, forming part of this specification, in which—

Figure 2:
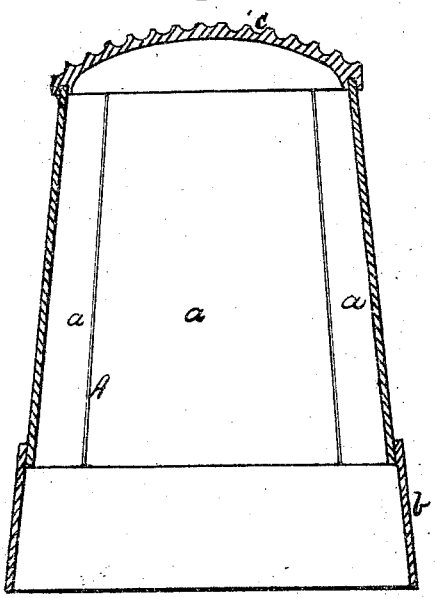
Figure 1:
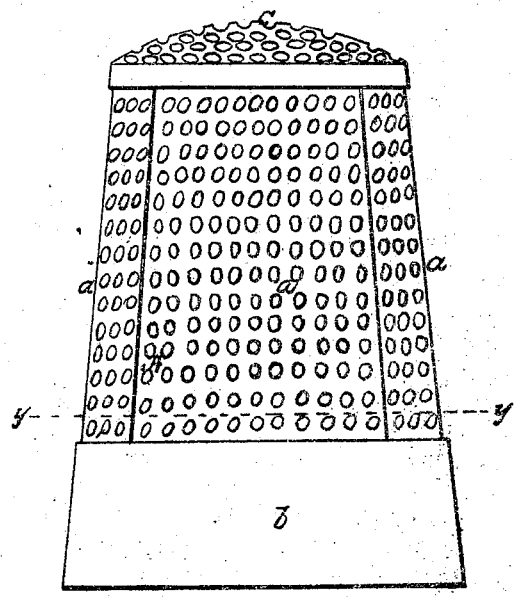
Figure 3:
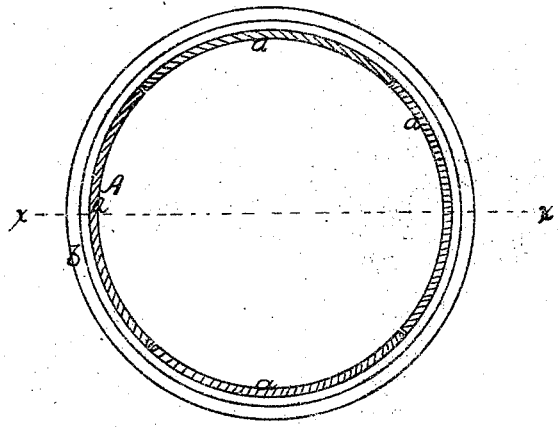

Figure 1 represents an elevation of my invention. Fig. 2 is a vertical central section of the same, taken in the plane indicated by the line $x$, $x$, Fig. 3. Fig. 3 is a horizontal section of the same, the line $y$, $y$, Fig. 1, indicating the plane of section.

Similar letters of reference indicate corresponding parts in the three figures.

All the attempts heretofore made to cover the surface of a thimble with enamel have failed because the composition which constitutes the enamel, when applied to said round surface runs off from that portion which is on the top during the time the enamel is left to dry, and it collects at the bottom part, thus producing a rugged and uneven surface. For this reason a thimble having its round surface covered with enamel has heretofore not been known, and all attempts to produce such have signally failed, until after manifold experiments I have succeeded in constructing such a thimble by making the same out of six (more or less) pieces, four of which together with the bottom ring constitute the tapering shell having its small end closed by the last piece that forms the cap of the thimble.

That portion of the shell which is covered with enamel is made out of four sectors, and before the shell is put together the curved surface of each of these sectors is covered with enamel, which will now stick to said surface without danger of running off or accumulating on one portion of the shell.

The construction of my thimble will be fully understood by referring to the drawing.

The shell A, is constructed out of four sectors $a$, which are secured together on their bottom ends by the ring $b$, and on their top ends by the cap $c$, as clearly shown in Figs. 1 and 2 of the drawing. The sectors $a$, before they are joined together are covered on their curved surfaces with enamel in the ordinary manner, and since the surface of each sector is but slightly curved the composition readily adheres to it, and after having been burned or dried it presents a smooth surface.

If it is desired, indentations may be made into the enamel before it is dry to afford a good hold to the needle, or the cap alone may be provided with such indentations, as shown in Fig. 2. It must be remarked that I do not confine myself to the exact number of four sectors, since, under certain circumstances it may be sufficient to use only three, and under other circumstances the number may be increased to five or more.

The ring $b$, and the cap $c$, may be made of gold or some other costly material, whereas that portion of the shell which is covered by the enamel, is made of sheet copper, or some other cheap material; and when my thimble is finished it presents an appearance superior in beauty and richness to thimbles made entirely of gold or silver. By these means I am enabled to produce a highly ornamental and beautiful article at a comparatively small expense.

Having thus described my invention, what I claim as new, and desire to secure by Letters Patent, is:—

A thimble, such as herein described, having its shell A, made of several sections $a$, covered with enamel and secured together by a ring $b$, and cap $c$, in the manner and for the purpose specified.

BENJAMIN W. HOOD.

Witnesses:
J. LOTHROP, Jr.,
C. W. THRASHER.